United States Patent
Bogle et al.

(10) Patent No.: US 9,527,673 B2
(45) Date of Patent: Dec. 27, 2016

(54) SPIRAL CONVEYOR WITH CONTROLLED TAKE-UP

(71) Applicant: Laitram, L.L.C., Harahan, LA (US)

(72) Inventors: David W. Bogle, Round Rock, TX (US); Jonathan W. Mays, Tickfaw, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/780,192

(22) PCT Filed: Apr. 22, 2014

(86) PCT No.: PCT/US2014/034914
§ 371 (c)(1),
(2) Date: Sep. 25, 2015

(87) PCT Pub. No.: WO2014/176214
PCT Pub. Date: Oct. 30, 2014

(65) Prior Publication Data
US 2016/0046447 A1    Feb. 18, 2016

Related U.S. Application Data

(60) Provisional application No. 61/816,185, filed on Apr. 26, 2013.

(51) Int. Cl.
| | |
|---|---|
| *B65G 21/18* | (2006.01) |
| *B65G 23/44* | (2006.01) |
| *B65G 43/00* | (2006.01) |

(52) U.S. Cl.
CPC .............. *B65G 21/18* (2013.01); *B65G 23/44* (2013.01); *B65G 43/00* (2013.01)

(58) Field of Classification Search
CPC ......... B65G 23/44; B65G 21/18; B65G 43/00; B65G 2207/24; B65G 17/066; B65G 17/068; B65G 17/086
USPC ......................................... 198/778, 813–816
See application file for complete search history.

(56) References Cited

U.S. PATENT DOCUMENTS

| | | | |
|---|---|---|---|
| 3,348,659 A | 10/1967 | Roinestad | |
| 3,750,859 A | 8/1973 | Smith | |
| 4,866,354 A | 9/1989 | Miller | |
| 4,941,566 A * | 7/1990 | Irwin | B65G 21/18 198/688.1 |
| 5,191,267 A | 3/1993 | Machacek | |

(Continued)

FOREIGN PATENT DOCUMENTS

| | | |
|---|---|---|
| JP | 06072526 A | 3/1994 |
| WO | 2012009222 A1 | 1/2012 |

*Primary Examiner* — Mark A Deuble
(74) *Attorney, Agent, or Firm* — James T. Cronvich

(57) ABSTRACT

A spiral conveyor and a method for taking up slack in a modular conveyor belt traveling a helical path. The spiral conveyor includes a rotating cylindrical drive drum with parallel drive members extending from the bottom to the top of the drum on its periphery. Each drive member includes an outwardly protruding ridge extending from the bottom to the top of the drum for engaging the inside edges of the belt. A motor-driven take-up shaft and shaft-mounted sprocket set takes up slack in the belt after its release from the drum. To control tension at the discharge of the belt from the drive drum, the take-up motor is normally operated in a closed-loop control mode, but switches to an open-loop constant-speed control mode when the take-up motor stalls.

23 Claims, 3 Drawing Sheets

(56) References Cited

U.S. PATENT DOCUMENTS

| | | | |
|---|---|---|---|
| 5,467,865 A | 11/1995 | Irwin | |
| 5,743,376 A | 4/1998 | Ochs | |
| 6,050,394 A * | 4/2000 | Daringer | B65G 15/54 |
| | | | 198/778 |
| 6,394,261 B1 * | 5/2002 | DeGennaro | B65G 21/18 |
| | | | 198/778 |
| 7,331,445 B2 * | 2/2008 | Roland | B65G 21/18 |
| | | | 198/778 |
| 8,181,771 B2 * | 5/2012 | Talsma | B65G 21/18 |
| | | | 198/778 |
| 2005/0109581 A1 * | 5/2005 | Roland | B65G 21/18 |
| | | | 198/778 |
| 2014/0299450 A1 * | 10/2014 | Tassy, Sr. | B65G 21/18 |
| | | | 198/778 |

\* cited by examiner

ND TAKE-UP

BACKGROUND

The invention relates generally to power-driven conveyors and more particularly to spiral conveyors in which a conveyor belt is driven in a helical path around a rotating drive tower.

Conveyor belts are often used to convey articles, such as foodstuffs and other materials, through cooled or heated environments. Spiral conveyors, in which a conveyor belt follows a helical path winding around a central tower, drum, or cage, are used in freezers and ovens to provide a long conveying path with a small footprint.

Some helical conveyors are constructed with a helical track supported on a central non-rotating tower. The conveyor belt is driven around the helical track by drive sprockets at a single location outside the helical path. The maximum tension in the belt, which occurs just ahead of its engagement with the drive sprockets, can be quite high for such a long belt. To reduce the maximum belt tension, overdrive spiral conveyor systems are used. In these overdrive systems, the conveyor belt is driven by frictional contact between the inside edge of the belt and the faster-rotating outer surface of the rotating drum about which the belt is helically wrapped. Because the belt is driven along the entire helical path, the maximum belt tension is decreased. But some tension is still needed for effective frictional engagement between the drum and the belt edge. Furthermore, the frictional engagement causes wear in the belt edge and the outer drum surfaces. Because a large portion of the rotational energy required to drive the drum is lost to friction, the motor and power requirements can be quite high. And, because overdrive systems are sensitive to friction between the outside of the drum and the inside edge of the belt, the proper settings of tension and overdrive vary from installation to installation.

Positively driven spiral systems, in which drive structure on the outside of a rotating cage engages structure on the inside of a conveyor belt, have been used to overcome some of the shortcomings of overdrive systems. Because there is positive engagement between regularly spaced drive structure on the cage and regularly spaced edge structure on the inside edge of the belt, there is no slip as in overdrive systems. No additional tensioning is needed and frictional losses are less. But one problem with positively driven spiral systems is in cleanly engaging the belt with and disengaging it from the drive structure on the cage. Another problem is that the belt loses its driving force as it exits the drive drum. In conventional spiral conveyors a take-up roller or sprocket downstream of the drum is operated at a constant speed. If the speeds of the take-up motor and the drum's motor are matched to ensure that the belt speed remains constant, operation will be problem-free. But changes in belt temperature, such in freezer or proofer applications, cause the belt to shrink and expand, which affects the timing of the belt from drum to take-up. When the speeds of a drum's motor and the take-up motor are fixed, the take-up can't adjust to the timing changes and will either pull too hard or not hard enough.

SUMMARY

A method embodying features of the invention for controlling tension in the discharge section of a spiral-belt conveyor system comprises: (a) driving a conveyor belt along a helical path from an entrance to an exit on a spiral-conveyor drive drum rotated at a drum speed; (b) driving the conveyor belt with a drive shaft driven by a take-up motor including in a discharge section of the conveyor belt's path downstream of the exit from the drive drum; (c) determining the tension in the conveyor belt in the discharge section; (d) controlling the speed of the take-up motor in a closed-loop control mode to adjust the speed of the take-up motor to maintain a constant tension in the conveyor belt in the discharge section; (e) determining the speed of the take-up motor; and (f) switching from the closed-loop control mode to an open-loop control mode controlling the take-up motor to run at a reduced speed when the determined speed of the take-up motor drops below a predetermined stall speed level.

In another aspect of the invention, one version of a spiral conveyor embodying features of the invention comprises a cylindrical drive drum having a vertical axis of rotation and drive members spaced apart around its periphery. A first motor coupled to the drive drum rotates the drive drum about its axis of rotation at a drum speed. A conveyor belt has an inside edge with drive-receiving members positively engaged by the drive members. The conveyor belt is arranged to travel along a helical path up or down the drive drum from an entrance to an exit. A take-up mechanism, including a drive shaft and a second motor operating at a take-up speed and driving the drive shaft, engages and drives the conveyor belt in a discharge section downstream of the exit. A sensor measures an operating variable of the spiral conveyor indicative of the tension in the conveyor belt in the discharge section and produces a feedback signal. A control system coupled to the second motor receives the feedback signal and produces a take-up speed signal to adjust the speed of the second motor as a function of the feedback signal in a closed-loop control mode of operation to maintain a constant tension in the conveyor belt in the discharge section.

In yet another aspect of the invention, another version of a spiral conveyor embodying features of the invention comprises a cylindrical drive drum having a vertical axis of rotation. A first motor is coupled to the drive drum to rotate the drive drum about its axis of rotation at a drum speed. A conveyor belt is arranged to travel along a helical path up or down the drive drum from an entrance to an exit. A take-up mechanism engages and drives the conveyor belt downstream of the exit in a discharge section and includes a drive shaft and a second motor operating at a take-up speed and driving the drive shaft. Stall-detection means detect a stalled condition of the second motor. Switching means switch control of the speed of the second motor from a closed-loop control to an open-loop constant-speed control when the stall-detection means detects a stalled condition.

BRIEF DESCRIPTION OF THE DRAWINGS

These features of the invention, as well as its advantages, are better understood by referring to the following description, appended claims, and accompanying drawings, in which:

DETAILED DESCRIPTION

Figure 1:
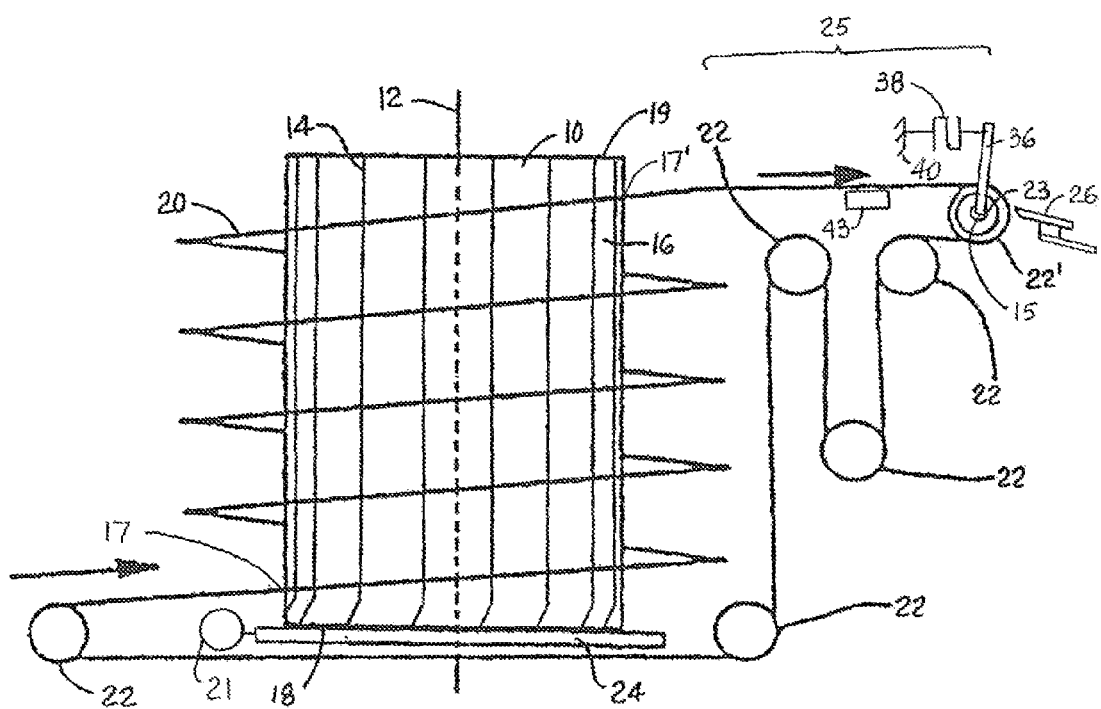
FIG. 1 is a side elevation schematic of a direct-drive spiral conveyor system embodying features of the invention.

A spiral conveyor is shown schematically in FIG. 1. The spiral conveyor includes a drive drum 10 in the form of a cylindrical drum or cage that is driven to rotate about a vertical axis of rotation 12. The rotating drum has a plurality of parallel, generally vertical drive members 14 spaced apart regularly around its periphery 16. Each drive member extends in length between a bottom 18 and a top 19 of the drum. A conveyor belt 20 follows a multi-tiered helical path around the drum from an entrance 17 to an exit 17'. The path is defined by a helical carryway or by a carryway at the bottom and stacker plates mounted on the belt. Drive-receiving elements on the inside edge of the belt positively engage the drive members, which drive the belt up or down the drum as it rotates. In this example, the belt is driven up the drum. The drum 10 is mounted at its bottom 18 to a base 24 and is rotated by a motor 21. The belt travels around various take-up, idle, and feed sprockets 22 as it makes its way from the exit 17' at the top of the drum back to the entrance 17 at the bottom. The take-up sprockets 22' mounted on a drive shaft 15 engage the belt in a discharge section 25 of the belt's path just downstream of the belt's exit 17' from the helical path. One example of such a spiral conveyor system is disclosed in International Publication No. WO2012/009222A1, "Positive-Drive Spiral Conveyor and Belt," published Jan. 19, 2012, which is incorporated into this application by reference.

Because the conveyor belt 20 is positively engaged and driven by the drive drum 10, the speeds of the drum and of the take-up mechanism comprising the take-up drive shaft 15, sprockets 22', and motor 23 must be coordinated, or synchronized. If the take-up motor runs too fast, it will try to pull the belt from the drum faster than the drum can supply it. This can cause the sprockets to skip and can damage the belt and the sprocket teeth. If the take-up motor runs too slow, the belt 20 will become slack in the discharge section 25 downstream of the belt's exit from the drum 10 and will start to pile up. To avoid these problems, the take-up drive motor 23 is operated in a closed-loop control mode, such as a closed-loop constant-torque control mode, during normal operation.

Figure 2:
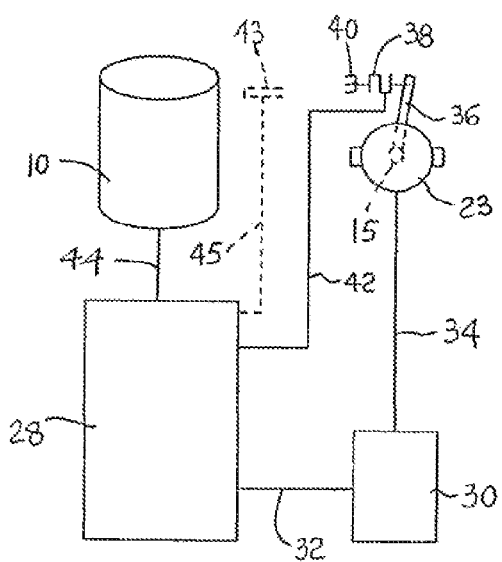
FIG. 2 is a block diagram of a control system for the spiral conveyor system of FIG. 1.

A block diagram of a control system for the take-up motor 23 is shown in FIG. 2. The exemplary control system includes a programmable logic controller (PLC) 28 or other programmable device and a motor controller 30, such as a variable-frequency drive. The controller 28 sends a take-up speed signal 32 to the motor controller 30, which controls the speed of the take-up motor 23 over a control line 34. A torque lever or arm 36 is attached at one end to the drive shaft 15, as also shown in FIG. 1. The distal end of the torque arm is attached to a load cell 38. The load cell is also attached to a stationary point 40. As the torque of the drive shaft 15 increases, the torque arm 36 rotates clockwise about its connection to the shaft. The load cell 38 produces a torque feedback signal 42, which is sent to the controller 28. Thus, the load cell serves as a torque sensor measuring the torque of the take-up drive shaft 15, which is indicative of the belt's tension in the discharge section 25. Another way to determine torque is by estimating it from a measurement of the take-up motor's current. And, instead of or in addition to measuring torque, the control system could use a tension sensor 43 measuring tension in the conveyor belt 20 in the discharge section 25. The tension sensor 43 may be a sensor mounted in the conveyor belt itself and sending a tension feedback signal 45 to the controller 28 or, for example, a load cell positioned beneath the belt in a slightly elevated carryway to sense belt tension by the belt's downward force against the carryway. So the sensor, whether a torque sensor or a tension sensor, measures an operating variable of the spiral conveyor that is indicative of the tension in the conveyor belt 20 in the discharge section 25.

The controller 28 is programmed to run a software control routine that compares the torque feedback signal 42 to a predetermined (operator settable or empirically set) torque setpoint. (Where the feedback signal is a tension measurement, the tension feedback signal 45 is compared to a tension setpoint.) The difference between those two quantities represents the controller's error signal, from which the controller computes the take-up speed signal 32. The control routine can be, for example, a proportional-integral-derivative (PID) controller. The proportional, integral, and derivative control-gain parameters can be empirically determined or manually selectable. Because the error signal is the difference between the measured torque and a setpoint torque value, the controller adjusts the speed of the take-up motor 23 to maintain a constant torque in the drive shaft 15 or constant tension in the conveyor belt in the discharge region. In this closed-loop control mode of operation, the take-up motor speed is adjusted dynamically to account for belt's stretching and shrinking and for other effects that cannot be overcome by running the motor at a constant speed.

In some applications, such as in freezers, conveyed food products can freeze to the conveying surface of the conveyor belt. In FIG. 1, a scraper 26 is shown positioned against the belt 20 as it rounds the take-up sprockets 22'. The scraper scrapes ice and frozen products from the belt. In some instances ice and frozen material can lodge between the scraper 26 and the belt 20. When that happens, the belt jams, causing the take-up motor 23 to stall and the belt being fed from the drum 10 to pile up.

To solve the problems associated with a stalled take-up motor 23, the controller provides switching means that switches from the closed-loop control mode of operation to an open-loop constant-speed mode of operation. The open-loop mode of operation can be set to persist for a predetermined (operator settable or empirically determined) time period or until the jam condition clears. Sensing the relaxation of pressure on the scraper, detecting a large decrease in motor current or power or drive-shaft torque from a high level, or visioning the scraper to detect the clearance of jamming material from the scraper are other ways to provide the controller with signals indicating that a jam has been cleared and the motor is no longer stalled so that closed-loop control can resume. The controller determines the speed of the take-up motor directly from a tachometer or an encoder on the motor shaft or indirectly from the speed signal computed by the control routine. When the take-up speed drops below a predetermined (operator settable or empirically determined) stall speed or the torque measurement rapidly increases beyond a standard torque level (both examples of stall-detection means), the switch from closed-loop to open-loop operation is made, and the controller sends a reduced take-up speed signal to the motor controller 30. The reduced speed signal persists for the duration of the predetermined time period or until the jam condition is indicated to have cleared. Then the controller 28 switches back again to the closed-loop control mode.

As shown in FIG. 2, the controller receives a drum-speed signal 44 from the drum motor or its speed controller. From the drum speed, the controller 28 computes a nominal take-up speed, which represents a take-up speed that is consistent with the drum speed in the absence of load, temperature, or other effects that would ordinarily affect the timing between the drum and the take-up mechanism. For example, the nominal speed could be empirically determined or could be the average speed during typical closed-loop operation. The stall speed at which the controller switches from closed-loop to open-loop operation can be set, for example, as a fractional percentage (e.g., 10%) of the nominal take-up speed. Likewise, the reduced-speed setting for open-loop constant-speed operation can be set, for example, as a fractional percentage (e.g., 80%) of the nominal take-up speed.

Figure 4:
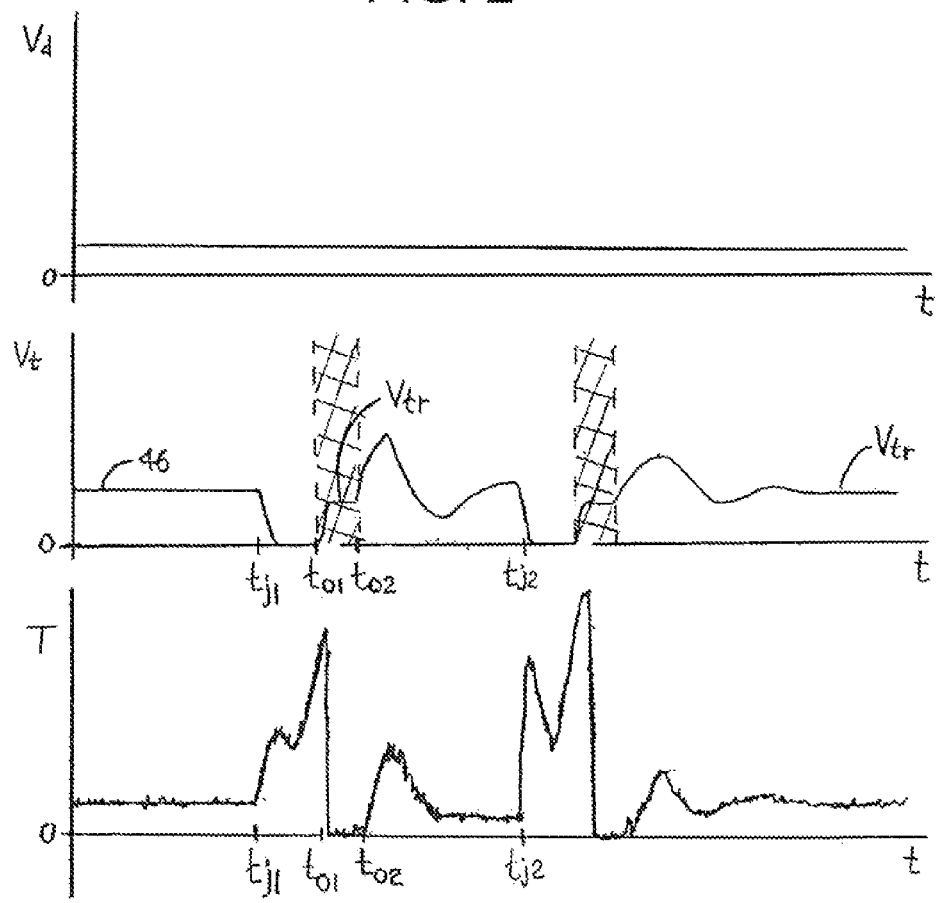
FIG. 4 is a timing diagram of drum-motor speed, take-up motor speed input, and drive-shaft torque illustrating the operation of the control system of FIG. 2.
Figure 3:
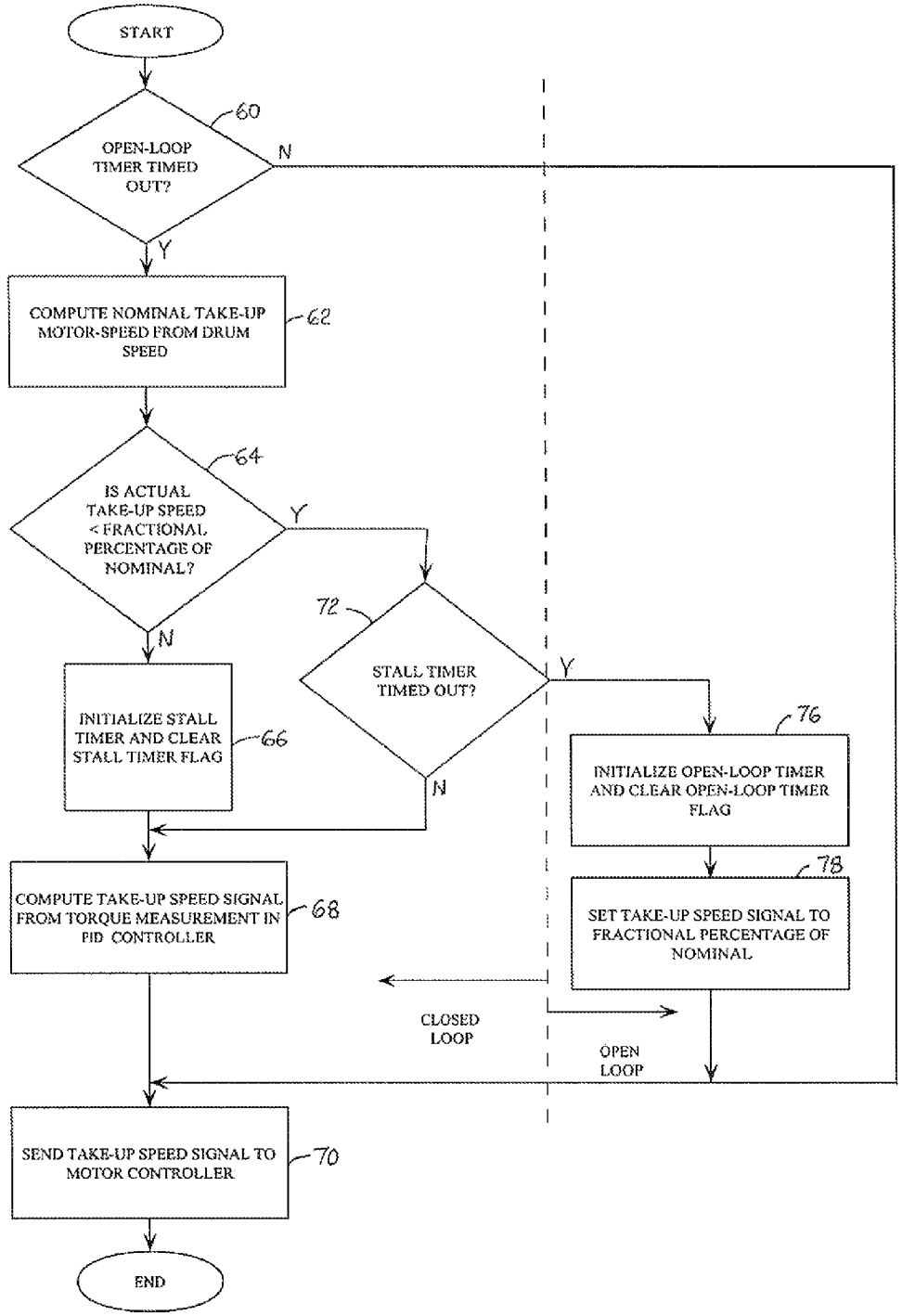
FIG. 3 is a flowchart of control-mode-switching routine run by a controller in the control system of FIG. 2.

The operation of the controller during jam conditions is illustrated by the timing diagrams of FIG. 4 and the flowchart of an exemplary version of the control-mode switching routine in FIG. 3. As shown in FIG. 4, the drum speed ($V_d$, top trace) is held constant throughout. The middle trace shows the take-up speed control signal $V_t$ on the control line 34 with the controller operated in the closed-loop control mode as a constant-torque controller by way of example. The signal starts out at a constant level corresponding to the nominal take-up speed 46. While the take-up motor is running at the nominal take-up speed, the torque (T, bottom trace) is also constant thanks to the closed-loop constant-torque control. When a jam starts to occur as at time $t_{j1}$, the controller decreases the take up speed $V_t$ to counter the rapidly increasing torque T in the drive shaft. The control-loop switching routine of FIG. 3, which the controller 28 runs at a periodic rate, first, in step 60, determines if an open-loop timer has timed out to indicate the end of the predetermined open-loop period. The routine checks the status of an open-loop timer flag, which is initially set at start-up. If the open-loop timer is not running, the routine computes the nominal take-up speed as a function of the drum speed in step 62. Then the routine compares the actual take-up speed to a stall speed level (some fractional percentage of the nominal take-up speed) in step 64. If the actual speed exceeds the stall speed, the controller operates in the closed-loop constant-torque control mode. First, the routine starts a stall timer and clears a stall timer flag in step 66. The stall timer flag is initially cleared at start-up. Because the stall timer is restarted every time the actual speed exceeds the stall speed, it will never time out as long as the actual speed remains above the stall speed. Then the routine runs the constant-torque PID (or other) controller routine in step 68. The controller routine computes an updated take-up speed from the measured torque and the torque setpoint. Finally, the updated take-up speed is sent to the motor controller in the take-up speed signal in step 70. When the routine next runs, if the actual take-up speed is less than the stall speed level, the routine first checks the stall timer flag to see if the stall timer, which was initialized and the stall timer flag cleared the last time that the actual speed exceeded the stall speed, has timed out in step 72. If it hasn't timed out (the stall timer flag is still cleared), indicating that the stalled condition hasn't persisted long enough, the routine runs the closed PID controller routine again. If the motor is, in fact, stalled, the PID controller continues to decrease the take-up speed toward zero. If the take-up speed remains below the stall speed level, eventually the stall timer times out, and the routine starts an open-loop timer and clears the open-loop timer flag in step 76, indicating the start of the open-loop control mode. In step 78, the take-up speed is set to a constant reduced speed level, i.e., a fractional percentage of the nominal take-up speed. The reduced take-up speed is sent to the motor controller in the take-up speed signal in step 70. The next time the routine runs, the open-loop timer will not be timed out yet and the controller sends the same reduced take-up signal to the motor controller. Open-loop operation continues until the open-loop timer times out and normal operation is resumed from step 60. Thus, the controller 28 running its control-mode switching routine includes stall-detection means for detecting a stalled take-up motor and switching means for switching between open- and closed-loop motor control. In this example, the open-loop and stall timers are run by timer routines that decrement the timers at regular intervals and set timeout flags, i.e., the open-loop and stall timer flags, for example, when the timers time out. Those flags indicate to the two decisions blocks 60 and 72 whether the timers have timed out. As one alternative, the timers could be internal to the control-loop switching routine, because that routine runs at a regular periodic rate. In that case, the stall timer would be decremented by the switching routine every time the actual take-up speed is less than the stall speed, and the open-loop timer would be decremented every time the open-loop timer is not timed out.

The signal time traces in FIG. 4 illustrate the operation of the control-mode switching routine. After a jam commences at $t_{j1}$, the stall timer eventually times out and open-loop control commences at $t_{o1}$. The take-up motor runs open loop at the reduced take-up speed $V_{tr}$ for the duration of the open-loop timer period, which expires at $t_{o2}$. Closed-loop constant-torque control then resumes. The take-up speed initially increases to take up accumulated slack in the belt and finally starts to settle when a second jam occurs at $t_{j2}$. The control-mode switching routine operates as for the first jam. Eventually, the closed-loop constant-torque control settles out to run the take-up motor at the nominal take-up speed $V_{tr}$. (The cross-hatched regions in the middle trace indicate the open-loop control mode; at all other times, the control loop is closed.)

Although the invention has been described with respect to an exemplary version, other versions are possible. For example, the take-up motor could be realized as any kind of motor whose speed can be varied with or without a variable-frequency drive. As another example, the controller with control-mode switching could operate with low-tension, overdriven spirals or with stacker spirals, as well as with the positively driven spiral described by way of example.

What is claimed is:

1. A method for controlling tension in the discharge section of a spiral-belt conveyor system, comprising:
   driving a conveyor belt along a helical path from an entrance to an exit on a spiral-conveyor drive drum rotated at a drum speed;
   driving the conveyor belt with a drive shaft driven by a take-up motor including in a discharge section of the conveyor belt's path downstream of the exit from the drive drum;
   determining the tension in the conveyor belt in the discharge section;
   controlling the speed of the take-up motor in a closed-loop control mode to adjust the speed of the take-up motor to maintain a constant tension in the conveyor belt in the discharge section;
   determining the speed of the take-up motor;
   switching from the closed-loop control mode to an open-loop control mode controlling the take-up motor to run at a reduced speed when the determined speed of the take-up motor drops below a predetermined stall speed level.

2. The method of claim 1 further comprising computing a nominal take-up speed as a function of the drum speed, wherein the take-up motor running at the nominal take-up speed is coordinated with the rotation of the drive drum.

3. The method of claim 2 further comprising setting the reduced speed to a level less than the nominal take-up speed.

4. The method of claim 1 further comprising setting the reduced speed as a function of the drum speed.

5. The method of claim 1 wherein the reduced speed is greater than the stall speed level.

6. The method of claim 1 wherein the take-up motor is controlled to run at the reduced speed for a predetermined period after the switch from the closed-loop control mode to the open-loop control mode and further comprising switching back to the closed-loop control mode when the predetermined period expires.

7. The method of claim 1 wherein the tension in the conveyor belt in the discharge section is measured by a tension sensor.

8. The method of claim 1 wherein the tension in the conveyor belt in the discharge section is determined from a measurement of torque in the drive shaft.

9. The method of claim 1 wherein the tension in the conveyor belt in the discharge section is determined from a measurement of the current of the take-up motor.

10. A spiral conveyor comprising:
a cylindrical drive drum having a vertical axis of rotation and drive members spaced apart around its periphery;
a first motor coupled to the drive drum to rotate the drive drum about its axis of rotation at a drum speed;
a conveyor belt having an inside edge with drive-receiving members positively engaged by the drive members, the conveyor belt arranged to travel along a helical path up or down the drive drum from an entrance to an exit;
a take-up mechanism drivingly engaging the conveyor belt in a discharge section downstream of the exit and including a drive shaft and second motor operating at a take-up speed and driving the drive shaft;
a sensor measuring an operating variable of the spiral conveyor indicative of the tension in the conveyor belt in the discharge section and producing a feedback signal;
a control system coupled to the second motor and receiving the feedback signal and producing a take-up speed signal to adjust the speed of the second motor as a function of the feedback signal in a closed-loop control mode of operation to maintain a constant tension in the conveyor belt in the discharge section;
wherein the sensor is a torque sensor measuring torque in the drive shaft and wherein the control system compares the feedback signal to a torque setpoint value to produce the take-up speed signal.

11. A spiral conveyor as in claim 10 wherein the control system computes a nominal take-up speed for the second motor as a function of the drum speed, wherein the take-up motor running at the nominal take-up speed is coordinated with the rotation of the drum.

12. A spiral conveyor as in claim 10 wherein the control system disables the closed-loop control mode of operation and switches to an open-loop control mode of operation when the control system detects a jam condition.

13. A spiral conveyor as in claim 12 wherein the control system switches back to the closed-loop control mode of operation after a predetermined period.

14. A spiral conveyor as in claim 10 wherein the control system includes a programmable logic controller receiving the feedback signal and computing the take-up speed signal and a variable-frequency drive coupled to the second motor and receiving the take-up speed signal from the programmable logic controller to adjust the speed of the second motor.

15. A spiral conveyor as in claim 10 wherein the torque sensor comprises:
a torque arm connected to the drive shaft; and
a load cell connected between the torque arm and a stationary attachment point.

16. A spiral conveyor comprising:
a cylindrical drive drum having a vertical axis of rotation;
a first motor coupled to the drive drum to rotate the drive drum about its axis of rotation at a drum speed;
a conveyor belt arranged to travel along a helical path up or down the drive drum from an entrance to an exit;
a take-up mechanism drivingly engaging the conveyor belt downstream of the exit in a discharge section and including a drive shaft and second motor operating at a take-up speed and driving the drive shaft;
stall-detection means for detecting a stalled condition of the second motor;
switching means for switching from a closed-loop control of the second motor to an open-loop constant-speed control of the speed of the second motor when the stall-detection means detects a stalled condition.

17. A spiral conveyor as in claim 16 wherein the switching means includes a timer that is initialized when a stalled condition is detected to time out in a predetermined period and wherein the switching means switches from the open-loop constant-speed control of the speed of the second motor to the closed-loop control of the second motor when the timer times out.

18. A spiral conveyor as in claim 16 comprising a controller controlling the speed of the second motor and including the stall-detection means and the switching means.

19. A spiral conveyor as in claim 18 further comprising a torque sensor measuring the torque of the drive shaft and sending a torque signal to the controller.

20. A spiral conveyor as in claim 19 wherein the stall-detection means detects a stall from a rapid increase in the torque measurement.

21. A spiral conveyor as in claim 19 wherein the controller controls the speed of the second motor in the closed-loop control to maintain a constant torque in the drive shaft.

22. A spiral conveyor as in claim 18 further comprising a tension sensor measuring the tension in the conveyor belt in the discharge section and sending a tension signal to the controller to maintain constant tension in the conveyor belt in the discharge section.

23. A spiral conveyor as in claim 16 wherein the cylindrical drive drum has drive members spaced apart around the periphery of the drum and wherein the conveyor belt has an inside edge with drive-receiving members positively engaged by the drive members.

* * * * *